(No Model.)
J. T. FOSTER.
DRILL CHUCK.
No. 266,803. Patented Oct. 31, 1882.
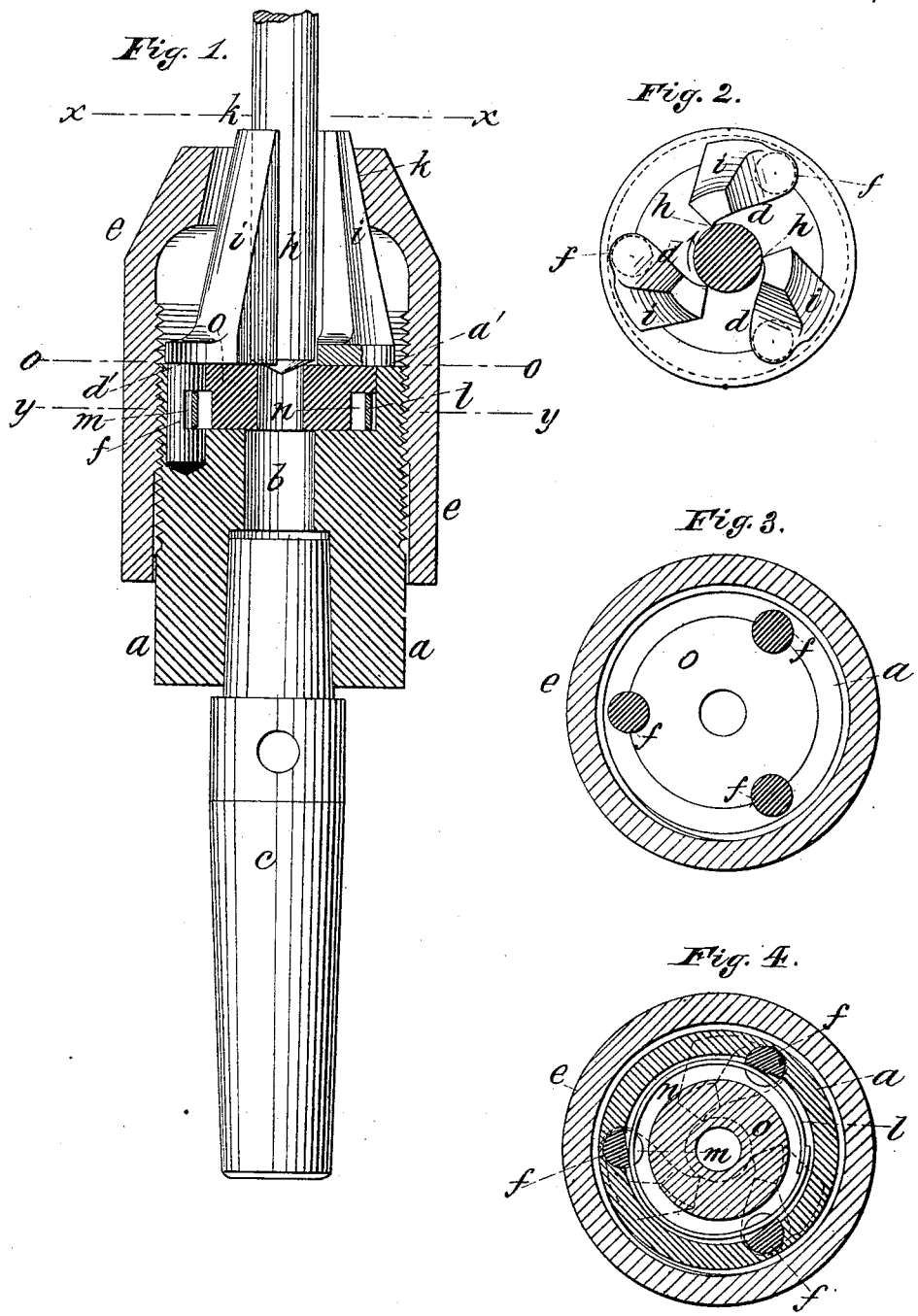
Witnesses:
Henry F. Parker
R. M. Curtis
Inventor:
John T. Foster
by Chas. M. Higgins
Attorney

UNITED STATES PATENT OFFICE.

JOHN T. FOSTER, OF ARLINGTON, NEW JERSEY.

DRILL-CHUCK.

SPECIFICATION forming part of Letters Patent No. 266,803, dated October 31, 1882.

Application filed February 14, 1882. (No model.)

*To all whom it may concern:*

Be it known that I, JOHN T. FOSTER, of Arlington, in the county of Hudson and State of New Jersey, have invented certain new and useful Improvements in Drill-Chucks, of which the following is a specification.

Drill-chucks, as is well known, usually consist of a rotary hub or head, carrying a number of radial jaws, over which is placed a conical sleeve, which screws down upon the head, and thus forces or wedges the jaws inward to grasp the drill. The jaws have been formed and arranged in a variety of ways; but they are usually arranged in radial slots or sockets in the head and slide in direct radial lines to or from the central drill-socket, in the manner of simple wedges, and their grasping power on the drill thus depends entirely on the wedging pressure by which they are forced against the drill by the action of the conical screw-sleeve.

Now, in my improved drill-chuck the jaws are pivoted to the head tangential to or outside of the drill, and they approach and bear upon the drill in the manner of pawls, and the exterior of the jaws has a conical spiral surface to match with the conical or wedging surface on the interior of the sleeve, by which they are forced against the drill.

The main feature of my invention, as here outlined, not only produces a very strong and simple chuck, but one in which the grasp is very powerful, for in this case the grasp does not depend entirely on the wedging pressure of the conical screw-sleeve, for the greater the torsional strain on the drill the greater is the grasp of the jaws, which tend to enter or close upon the drill by the tendency of the drill to rotate against the tangentially-presented edges of the pawl-jaws.

My invention also consists in the special construction and arrangement of the jaws and of the other parts in relation thereto, as hereinafter fully set forth.

In the annexed drawings, Figure 1 presents a longitudinal section of my improved chuck. Fig. 2 is a plan of the head and jaws below the line $x\ x$ of Fig. 1, with the conical sleeve removed. Fig. 3 is a sectional plan on the line $o\ o$ of Fig. 1, and Fig. 4 is a sectional plan lower down on the line $y\ y$.

In these figures, $a$ indicates the head or hub of the chuck, which, as usual, is preferably formed with a central bore, $b$, which is enlarged and slightly tapered at the base to receive the tapered shank of the tapered spindle $c$, which is driven into the line-spindle of the lathe in the usual manner when the chuck is attached to the lathe. This chuck-head $a$ is much shorter than is usual, and is formed with a flat top, $a'$, which terminates within the cavity of the screw-sleeve $e$ at about the middle thereof, as seen in Fig. 1, while the sleeve screws onto the upper end of the chuck-head in about the ordinary manner, as illustrated.

$d\ d\ d$ indicate the grasping-jaws of the chuck, which, as usual, are preferably three in number, arranged equidistant around the center of the chuck, as seen best in Fig. 2. These jaws rise in isolated position from the flat top of the chuck-head, as will be understood from Figs. 1 and 2, instead of being arranged in radial slots in the head, as is usual, and each jaw has a flat base or shoulder, $d'$, which seats on the flat top of the chuck-head, as seen best in Fig. 1, and from this shoulder a pivotal stem or pintle, $f$, projects downward, and is journaled in a socket-hole bored in the head, as best shown in Figs. 1, 3, and 4. Each jaw is thus hinged or pivoted on the chuck-head at or near its circumference, and it will be noted, on reference to Fig. 2, that the pivotal axis $f$ of the jaws is at some lateral or circumferential distance from the grasping-edges $k$ of the jaws; and it will hence be noted that the jaws are presented to the drill in a tangential direction, or in the manner of pawls. Therefore if the jaws be forced against the drill their grasp thereon will be very powerful, for not only will they seize it by virtue of the direct wedging pressure by which they are forced by the sleeve against the drill, but in addition to this the torsional strain on the drill, when turned in the direction of advance, as indicated by the arrow in Fig. 2, will simply tend to tighten the grasp of the pawl-jaws, for the tendency of the jaws will be to enter the sides of the drill, as will be readily understood in reference to Fig. 2, thus maintaining a powerful grasp upon the drill, and preventing all slippage during the advance of the drill into the work.

The outer sides, $i$, of the jaws opposite the grasping-edges $h$, as seen best in Figs. 1 and 2, are formed with an inclined or wedging surface, which matches with a similar inclined or conical surface, $k$, on the contracted mouth of the sleeve $e$, so that as the sleeve is screwed downward the jaws are thus wedged together to grasp the drill, as will be understood. The inclined surface $i$ in the jaws is however made a little twisting or spiral in its character, as shown in Fig. 2, in order to match with the conical face $k$ on the sleeve in the different positions in which the jaws may be forced by the sleeve, for it will be noted that in this chuck the jaws move in the arc of a circle struck from the center of the pintles $f$ toward the center of the drill, and hence require this spiral inclination, which would not be the case where the jaws moved radially in or out. When the sleeve $e$ is unscrewed a spring, $l$, causes the jaws to be diverged or thrown open to release the grasp on the drill or to expand the opening of the jaws to receive a drill of larger size, as will be understood. This spring $l$, as seen best in Fig. 4, is a flat plate-spring coiled in a single flat coil, and bears in deep flat notches $m$, cut on the middle of the pintles. The spring is socketed in a circular recess, $n$, formed in the top of the chuck-head $a$, and is held therein by a plug or disk, $o$, tightly driven into this recess, which plug is turned off or recessed on its under side, so as to leave an annular socket for the spring, as shown in Figs. 1 and 4.

It will also be seen on reference to Figs. 2, 3, and 4 that the holes for the pivotal pintles are bored on the junctional line of the plug $o$ with its socket. Hence the notched sides of the pintles $f$ project into the annular recess $n$, where they are engaged by the spring $l$, as seen in Figs. 1 and 4. It will hence be understood that when the jaws are forced or turned inward the flatted or notched part of their pintles will tend to bend the spring $l$ inward, and the reaction of this spring will of course diverge or expand the jaws outward as soon as the sleeve is unscrewed, and, in addition to this opening action of the spring on the jaws, the spring, as will be readily seen, also serves to hold the jaws in the head and prevent them dropping out of place, even though the sleeve be entirely removed, which is an important advantage over several existing chucks, in which the jaws and their springs will fall out if the sleeve be unscrewed too far.

It will thus be seen that by these features of construction I form a chuck which has only a very powerful and certain grasp, but possesses a really simple and inexpensive construction, has no loose or detached parts, is compact in form, and its working parts are not capable of being clogged by chips, as its joints and springs are completely inclosed, thereby combining a number of important advantages.

I do not wish to be understood as broadly claiming partly rotary jaws acting in the manner of pawls; but

What I claim is—

1. In a drill-chuck, the combination, with a sustaining chuck-head, of a series of radially-arranged jaws pivoted on the chuck-head at or near the outer circumference thereof, with their grasping ends presented tangentially inward toward the drill in the manner of pawls, with an encircling sleeve screwing onto the chuck-head over the said pawl-jaws to wedge the same inwardly, substantially as herein set forth.

2. The combination, with the chuck-head $a$, of the pivotal pawl-jaws $d$, having an inclined or wedging surface, $i$, on their exterior, with the screw-sleeve $e$ screwing onto the chuck-head over the said jaws, substantially as herein shown and described.

3. The combination, in a chuck with pivotal pawl-jaws, of the curved or coiled spring $l$, arranged to bear upon notched or flatted portions on the pivotal stems of the pawl-jaws, substantially as and for the purpose set forth.

4. The combination, in a chuck with pivotal pawl-jaws, of the spring $l$, socketed in a recess in the chuck-head, and the retaining-plug $o$, driven into the same, substantially as herein shown and described.

JOHN T. FOSTER.

Witnesses:
M. J. LEONARD,
CHAS. M. HIGGINS.